(12) United States Patent
DeVolpi

(10) Patent No.: US 6,198,391 B1
(45) Date of Patent: Mar. 6, 2001

(54) SELF SERVICE SALES AND SECURITY SYSTEM

(76) Inventor: Dean R. DeVolpi, 774 Mays Blvd., #10-424, Incline Village, NV (US) 89451

( * ) Notice: Subject to any disclaimer, the term of this patent is extended or adjusted under 35 U.S.C. 154(b) by 0 days.

(21) Appl. No.: 09/169,831

(22) Filed: Oct. 12, 1998

Related U.S. Application Data

(60) Provisional application No. 60/061,997, filed on Oct. 14, 1997.

(51) Int. Cl.$^7$ .................................................. G08B 13/14
(52) U.S. Cl. ......................... 340/568.2; 235/385; 705/28
(58) Field of Search ............................ 340/568.2, 568.1, 340/572.1, 825.34, 825.35; 705/22, 28; 235/385, 381; 221/2, 4, 5; 194/205, 906

(56) References Cited

U.S. PATENT DOCUMENTS

| | | | |
|---|---|---|---|
| 3,493,955 | * 2/1970 | Minasy | 340/572.5 |
| 3,716,697 | * 2/1973 | Weir | 340/825.35 X |
| 3,721,956 | 3/1973 | Hamann et al. | 340/429 |
| 4,088,873 | 5/1978 | Kinoshita et al. | 377/20 |
| 4,419,734 | 12/1983 | Wolfson et al. | 702/129 |
| 4,458,802 | 7/1984 | Maciver et al. | 194/205 |
| 4,589,538 | 5/1986 | Payraudeau | 194/205 |
| 4,598,810 | 7/1986 | Shore et al. | 194/205 |
| 4,789,293 | 12/1988 | Hashimoto et al. | 414/273 |
| 4,915,205 | 4/1990 | Reid et al. | 194/205 |
| 4,920,334 | 4/1990 | DeVolpi | 340/568.4 |
| 4,980,667 | 12/1990 | Ames | 340/427 |
| 4,995,498 | 2/1991 | Menke | 194/205 |
| 5,088,586 | 2/1992 | Isobe et al. | 194/205 |
| 5,313,393 | 5/1994 | Varley et al. | 705/28 |
| 5,407,050 | 4/1995 | Takemoto et al. | 194/205 |
| 5,671,362 | * 9/1997 | Cowe et al. | 340/568.1 X |
| 5,917,407 | * 6/1999 | Squire et al. | 340/568.1 X |

\* cited by examiner

*Primary Examiner*—Thomas Mullen
(74) *Attorney, Agent, or Firm*—Quinn & Quinn, P.C.; William J. Quinn; Cornelius P. Quinn

(57) ABSTRACT

A self service sales and security system for use in the retail sales environment including a means for identifying the presence, removal, and addition of each item of inventory on a merchandise rack and correlating the removal or addition of each item of inventory to an identifiable customer so that the customers can be automatically billed or charged for the items of inventory that the customer removes, and a report of which items need to be ordered to replenish inventory can be automatically prepared. The self service sales and security system includes customer records which may include credit information to selectively allow customers to remove only such items of inventory as their credit information allows; and an alarm is included to indicate tampering or the unauthorized removal of any item of inventory.

17 Claims, 5 Drawing Sheets

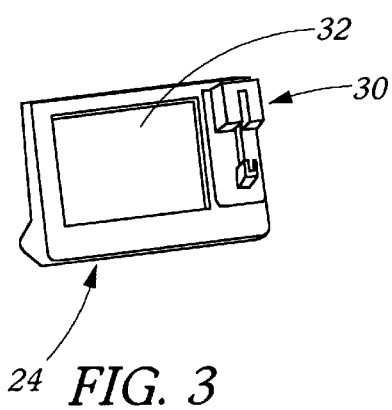
FIG. 3
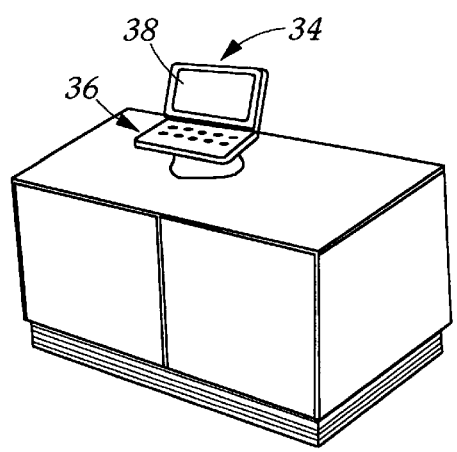
FIG. 4
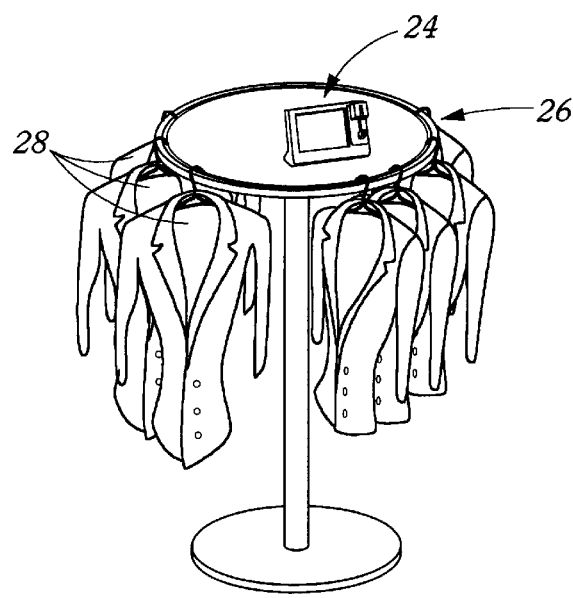
FIG. 2
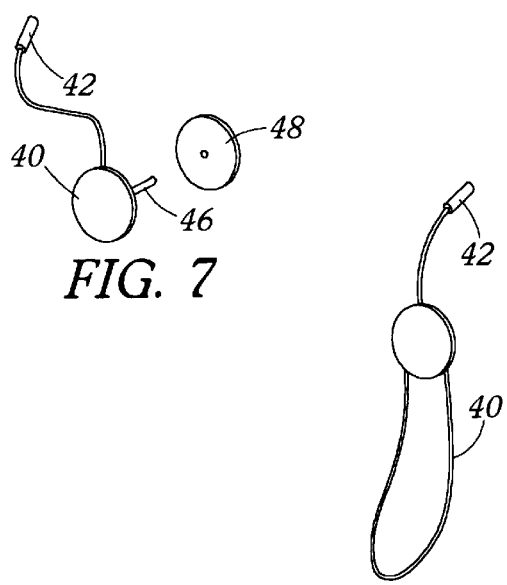
FIG. 7
FIG. 6
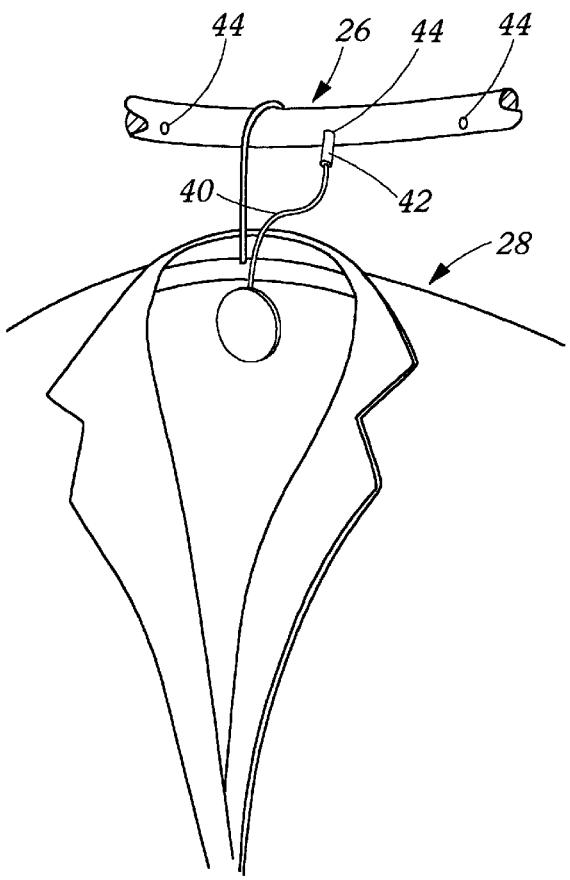
FIG. 5

SELF SERVICE SALES AND SECURITY SYSTEM

CROSS REFERENCE TO RELATED APPLICATION

This application claims the benefit of U.S. provisional patent application Ser. No. 60/061,997 filed Oct. 14, 1997 and entitled Self Service Sales and Rental Security System, which is incorporated herein by reference.

FIELD OF THE INVENTION

The present invention relates generally to systems and procedures used by retail stores to prevent theft of merchandise and maintain an inventory of items, and, more particularly, to a system and procedure to secure each item of inventory and to automatically identify and track each item of inventory from the point of delivery from the manufacturer to its sale to the ultimate purchaser.

BACKGROUND OF THE INVENTION

Theft of merchandise presents an ever present problem within the retail sales market, resulting in lost profits to retailers. In addition, the loss of merchandise by theft results in inaccurate inventories as the stolen items are often not accounted for until a manual inventory is performed. Such thefts may occur at any point in the flow of merchandise from the manufacturer to the point of sale to the ultimate purchaser, and include theft during transit from the manufacturer to the retailer, theft during the process of stocking merchandise, theft by employees, and theft by the public from the retailer's stores. Several methods are presently known and employed to identify and prevent such thefts. However, such known methods are either limited in their ability to detect all such thefts or are overly burdensome on customers during the process of shopping.

One such method presently employed to prevent theft of merchandise involves placing the merchandise within locked cases or locked storage rooms. When merchandise is locked within cases or storage rooms, an undue burden is placed on the customer, since assistance from a store clerk or manager is required to retrieve the merchandise and the customer is not able to physically examine the merchandise absent this assistance. During periods of high customer volume, sales may be lost due to customer impatience; and theft of merchandise may still occur, since during such periods of high customer volume, store clerks and managers may not be able to continually monitor customers for whom they have retrieved merchandise.

Another method employed to prevent theft of merchandise, often utilized with clothing of greater value, involves physically locking the merchandise to a rack by means of a cable or such. In use, such a method, has similar drawbacks to the method of locking merchandise in cases or storage room, in that, a store clerk or manager is required to unlock the item for the customer in the event of purchase, or for the customer to try on.

Although, U.S. Pat. No. 4,920,334 to DeVolpi describes a method to indicate if a cable used in locking merchandise to a rack is severed, the known methods of locking merchandise in a case, storage room, or to a rack are unable to prevent theft when items are received and before they are locked away or by employees who have access to the locked cases, storage rooms or racks.

Still another method currently employed to prevent theft of merchandise involves the utilization of security tags which are secured to items or their packaging by adhesive or mechanical means and will activate sensors at the entrance and exits to a store if not removed or deactivated. This method to prevent theft of merchandise is often ineffective, as the tags can often be easily removed or shielded from the sensors. Further, theft of the merchandise before it is tagged, or by employees who can deactivate or remove the tags, or by employees who can simply circumvent the sensors is not prevented.

Accordingly, it is the object of the present invention to provide an improved method of preventing and identifying theft of merchandise occurring anywhere between shipment from the manufacturer to sale to the ultimate purchaser, while reducing the burden of security measures on customers, and resulting in increased accuracy of inventory.

SUMMARY OF THE INVENTION

The objects of the present invention are accomplished by the self service sales and security system which comprises: a continuous loop signaling device which is incorporated within or attached to items in inventory; one or more racks, which may be used to support the items in inventory, and to which continuous loop signaling devices are detachably secured by locking mechanical means and electrically connected thereby at a distinct address; a control center connected to each rack and electrically connected to each continuous loop signaling device through the rack at each distinct address, wherein the control center can perceive the signal of each continuous loop signaling device independent of the other continuous loop signaling devices, and wherein the control center can selectively release the locking mechanical means securing a particular continuous loop signaling device to the rack; and a system controller which receives information from and sends information to the one or more control centers.

The control center has means for input of the identity of the individual seeking authorization to release a particular continuous loop signaling device and therefore a particular item. The control center's means for input of an individual's identity may be accomplished through use of a keypad or touch screen utilizing individual pass codes or by insertion of a card encoded with an individual's identity into a card reader incorporated into the control center.

The system controller receives information from the control centers indicating which continuous loop signaling devices are secured to the racks and maintains a permanent inventory of such continuous loop signaling devices upon a disk drive, EEPROM or similar recording device. Upon entry of a pass code or insertion of a card into a card reader of a control center , the e system controller receives information as to the identity of the individual seeking authorization to release a particular item. A permanent record for each individual's identity is maintained by the system controller which record could indicate a determined credit authorization for the individual, an accounting of which items are currently in the individuals possession, and a prior shopping history for the individual, including times and dates and identifying items accessed, returned and purchased. By evaluating the record from an individual's identity, the system controller directs the control center, either authorizing or denying access to a particular item and updating the record for the individual upon removal of any items from the rack.

In the event that the system controller receives information from a control center that a connection with a continuous loop signaling device has been lost without authorization from the system controller, such as if the continuous loop signaling device were severed, the system controller would maintain a record of the particular item involved, the location of the item and time and date. In such an event the system controller can be directed to automatically sound an alarm, contact security or contact law enforcement by radio or telephone transmission.

In practice of the current invention, items are ordered from a manufacturer and an invoice of the order is recorded within the system controller. The continuous loop signaling devices would preferably be interwoven within or applied to each item by the manufacturer; and in any event, the continuous loop signaling devices are applied to each item in such fashion that removal from an item would require severing the continuous loop signaling device.

When a delivery is received from the manufacturer, continuous loop signaling devices are attached to all the items delivered, if not previously attached by the manufacturer, and all the continuous loop signaling devices are secured to individual locations on one or more racks. Upon receiving a shipment from the manufacturer, notice of delivery and the identity of the employee or employees stocking the delivery are input into the system controller through a control center; and the location on a rack where a received item is secured and its identity are input into the system controller through a control center.

Once all received items are secured to a rack the system controller compares the items newly secured to all racks, with the ordered invoice, to identify any discrepancies. Instances of incomplete shipments, inaccurate shipments and theft in transit or during the process of stocking the shipment are therefore identified; and with the assistance of video surveillance equipment in receiving areas, any culpable employee of theft in receiving shipments is easily confirmed by examination of a short period of video tape.

Items may be removed form the racks only after an individual's identity is supplied to a control center and authorization for release of the continuous loop signaling device is received by the control center from the system controller. Customers utilize a pass code or identity card supplied by the retailer to input their identity to the control center; additionally, employees are supplied with their own pass code or identity card so that items may be released in instances of personal service upon a customer by a particular employee.

In the event that a customer does not wish to purchase an item released under their identity, the item may be placed in the charge of an employee authorized to receive items for restocking. The item released is then removed from the customer's record as being in their possession, and possession of the item is charged to the record of the particular employee receiving the item for restocking.

Should an item not be returned for restocking, the customer who released the item is identified by the system controller and their account is charged or they are billed for the item. And in the event that a returned item is not returned to a rack and the item has been input into the system controller as returned through a control center, the employee who received the item for restocking is easily ascertained from the record maintained by the system controller, and any instance of employee theft may be confirmed by use of video surveillance cameras and examining a short span of video tape as the system controller maintains time records and is able to indicate when an item was returned.

Finally, since the records of the system controller are updated and maintained to indicate the quantity and identification of items purchased by customers, as the retailers stock is depleted, the system controller is able to indicate to the retailer when there is a need to place orders with a manufacturer to replenish its inventory.

Although the continuous loop signaling devices of the present invention as described above may be comprised of a simple electrical conductive loop, a preferred embodiment of the present invention utilizes a signaling device that is smart, in that, a microchip or semi conductor circuit is incorporated within signaling device. By incorporating a microchip or semi conductor circuit into the signaling device, the signaling device can therefore be selectable or programmable so that the signaling device is able to communicate to the control center and identify the item to which it is attached.

Utilization of a smart signaling device greatly facilitates the use of the present invention as follows: when receiving merchandise for stocking or restocking with smart signaling devices attached, upon securing the item to any location on a rack, the control center and system controller would be able to immediately recognize what item has been received or returned without manual input of the location on a rack where the received item will be secured; and customers would be able to return and secure items to a rack and receive credit to their individual identity record without assistance from an employee.

An additional preferred embodiment of the present invention allows the use of credit and debit cards by customers as a means of input of an individual's identity. In such an embodiment, the system controller would receive the credit card information from the control center and through connection to its financial institution authorize the release of an item for billing directly to a customer's credit or debit account. This embodiment has the advantage of allowing customers to release items and purchase items without obtaining personal service from an employee or obtaining an individual identity pass code or card from the retailer.

In another preferred embodiment of the present invention, the system controller has the ability to access the internet, and is therefore able to selectively display product information obtained from a product manufacturer's web site on the screen of a control center at a customer's request.

Other objects, advantages and novel features of the present invention will become apparent from the following drawings and detailed description of the preferred embodiments.

BRIEF DESCRIPTION OF THE DRAWINGS

FIG. 2 is a plan view illustrating a rack with a control center with items supported by, electrically connected to, and secured to the rack.

FIG. 3 illustrates a control center of the invention.

FIG. 4 illustrates a system controller of the invention.

FIG. 5 is a plan view illustrating a clothing item of inventory with a signaling device attached, wherein the signaling device is electrically connected to and mechanically secured by a rack.

FIG. 6 illustrates a signaling device of the invention.

FIG. 7 illustrates a modified form of a signaling device of the invention.

DESCRIPTION OF THE PREFERRED EMBODIMENTS

Figure 1:
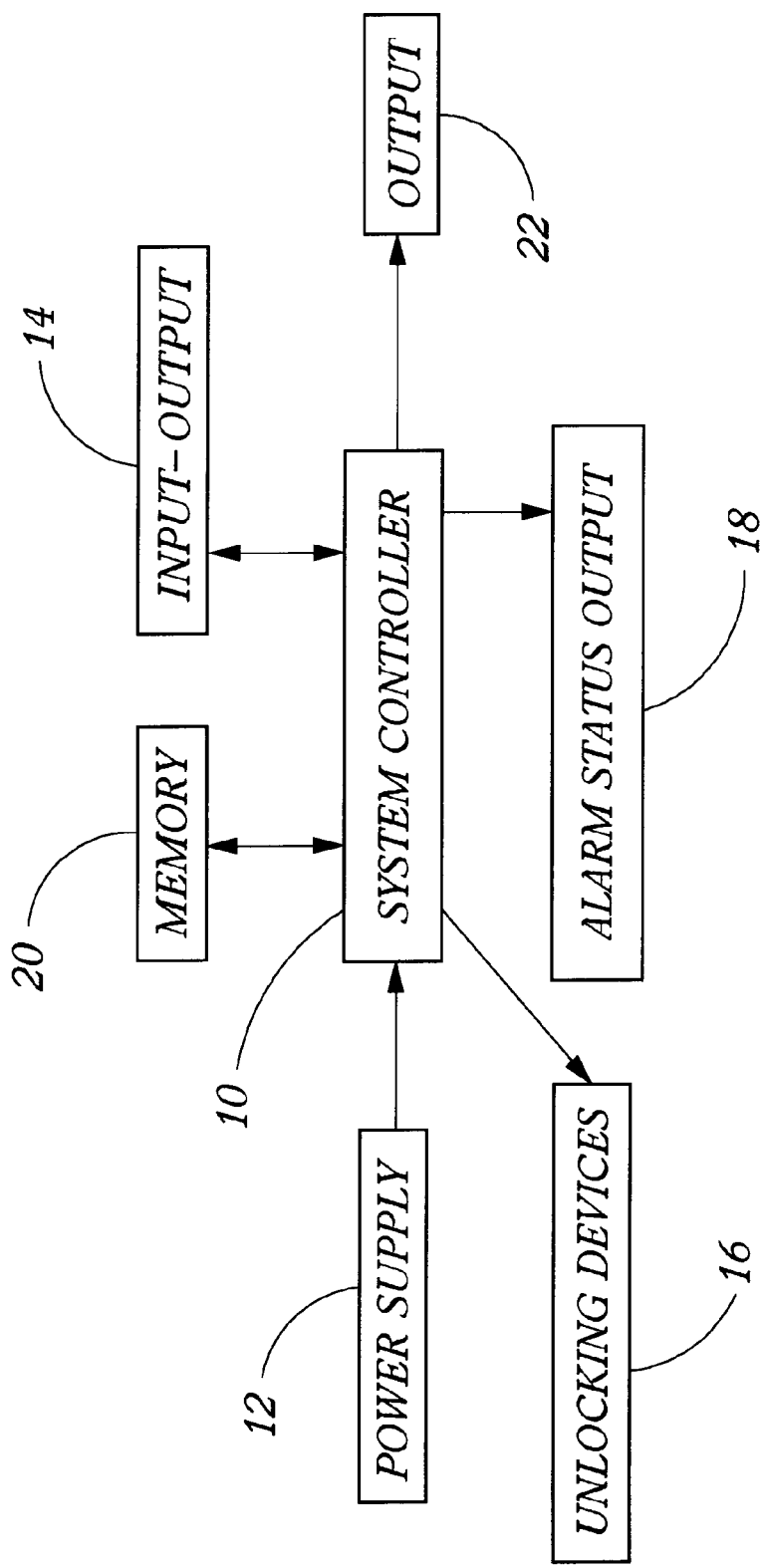
FIG. 1 is a block diagram illustrating the functional electrical connections of the system controller of the present invention.

FIG. 1 is a block diagram illustrating the control structure of a system controller 10 of the invention. Electrical power is supplied to the system controller 10 by a power supply 12 that may be of an AC or DC type and may incorporate a battery backup device. Input-output devices 14 are connected to the system controller 10 and include one or more control centers 24, which are depicted in FIGS. 2–3, and may include a modem to connect the system controller 10 to telephone lines, a keyboard for entry of data or any other similar device. Unlocking devices 16 are under the direction of the system controller through control centers 24. An unlocking device 16 might comprise, an electromagnetic, solenoid operated or motor driven release closing mechanism. An alarm status output 18 is provided by the system controller 10 which may be connected to audio devices, visual devices, RF devices, telephonic devices, direct cable devices. One or more memory devices 20 are connected with system controller 10 for storage and retrieval of data utilized by the self service sales and security system. Such memory devices 20 may be comprised of any one or more types of volatile and non-volatile memory, including, ram, rom, flash ram, eprom, eeprom, magnetic tapes, floppy disks, hard disk drives and optical storage devices, such as, cdrom, CD-R, CD-RW and DVD. An output 22 is provided by system controller 10, which may be connected to audio, video, or hard copy printing devices to indicate the current status or recorded data from the self service sales and security system.

FIG. 2 is a plan view showing a control center 24 which is connected to a rack 26, and a number of items of inventory 28 which are supported by rack 26.

FIG. 3 is an enlarged view of the control center 24 which communicates with system controller 10 and rack 26. Incorporated within control center 24 is a card reader 30 which enables the control center 24 to accept and read cards such as cards provided by a retailer, credit cards, debit cards and the like. Information read from a card by card reader 30 is transmitted by control center 24 to system controller 10. A display screen 32 is also incorporated within control center 24 to provide display information, such as customer record, credit and account information, selected inventory item information, product information from a manufacturer, product availability information and the like. The display screen 32 of control center 24 may be touch sensitive so that input and selections may be made by tactile contact with the display screen.

FIG. 4 illustrates a computer 34 with a keyboard 36 and a display screen 38 which serves as the system controller 10 and may incorporate power supply 12, one or more input-output devices 14 and memory devices 20. Additionally, one or more devices which receive alarm status output 18 or output 22 may be incorporated within computer 34.

FIG. 5 is a plan view illustrating an item of inventory 28 supported by a section of rack 26. Attached to the item of inventory 28 is a signaling device 40 having a connector 42, which is detachably secured to rack 26 through an aperture 44 in rack 26. Signaling device 40 is constructed with a loop of electrically conductive material which terminates upon a set of electrical contacts disposed upon or within connector 42. Disposed within each aperture 44 of rack 26 are a set of electrical contacts, corresponding to the electrical contacts of connector 42, of signaling device 40, such that electrical contacts of connector 42 are in electrical connection with the electrical contacts disposed within aperture 44 when connector 42 is secured to rack 26 through an aperture 44. Each set of electrical contacts disposed within each aperture 44 of rack 26 is independently connected to a control center 24 which in turn communicates the continuity status of the loop of electrically conductive material of each signaling device 40 to the system controller 10. The system controller 10 is therefore able to perceive the location of each signaling device 40 and the removal or any change in continuity of any signaling device 40.

One or more unlocking devices 16 within rack 26 are provided and are controlled by system controller 10 to selectively release a connector 42 within an aperture 44 of rack 26. Such unlocking devices might be comprised of an electromagnetic, solenoid operated or motor driven release mechanism which displaces a key within an aperture 44 of rack 26 from a locked to a release position; wherein the key engages a recess formed in connector 42 in the locked position, and disengages from the recess formed in connector 42 in the released position allowing the connector 42 to be removed from aperture 44.

FIG. 6 illustrates a signaling device 40, prior to attachment to an item of inventory 28, showing the loop of electrically conductive material and the connector 42.

FIG. 7 illustrates an alternate embodiment of a signaling device 40 which may be attached to an item of inventory 28, by piercing post 46 through a front side of an item of inventory 28, or its packaging, and securing a retainer 48 to post 46 at a back side of the item of inventory 28, or its packaging.

Figure 8:
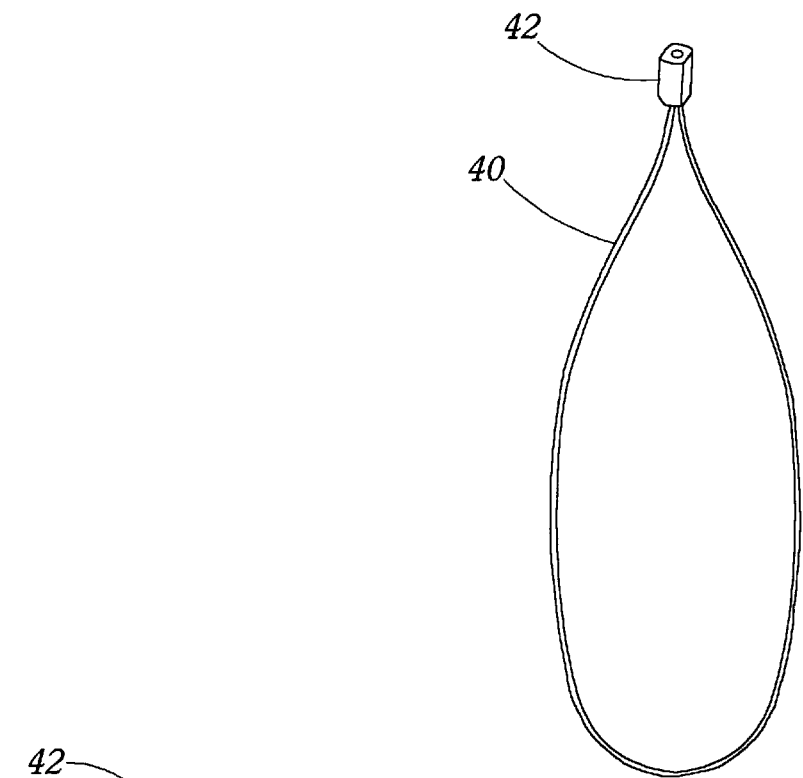
FIG. 8 illustrates another modified form of a signaling device of the invention.

FIG. 8 illustrates another alternate embodiment of a signaling device 40 with a continuous loop of electrically conductive material attached to a connector 42 and suitable to be incorporated into an item of inventory 28 during the process of manufacturing.

Figure 9:
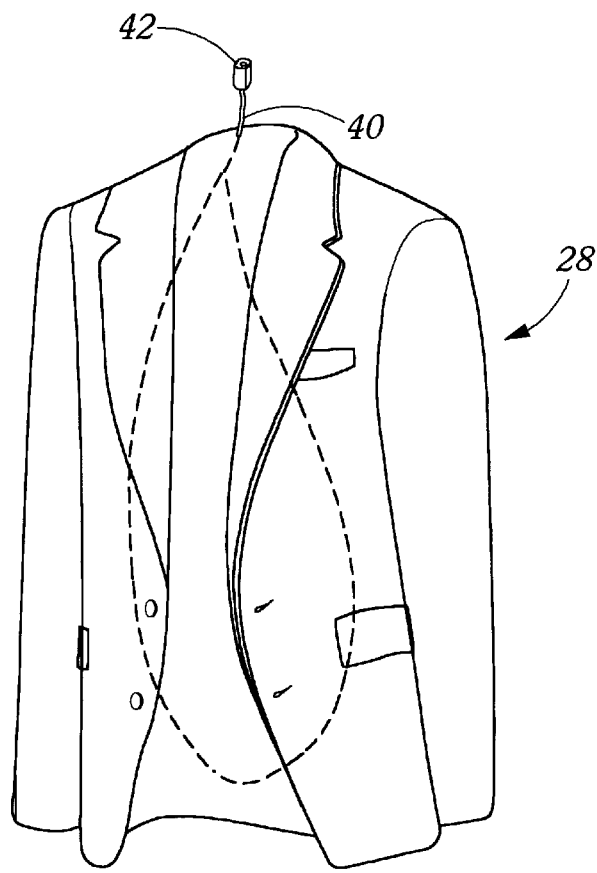
FIG. 9 illustrates a coat with the signaling device of FIG. 8 sewn therein.

FIG. 9 illustrates the signaling device 40 of FIG. 8 that has been incorporated into an item of inventory 28 during the manufacturing process, and indicating one possible arrangement, within the item of inventory 28, of the loop of electrically conductive material and connector 42 of signaling device 40.

Figure 10:
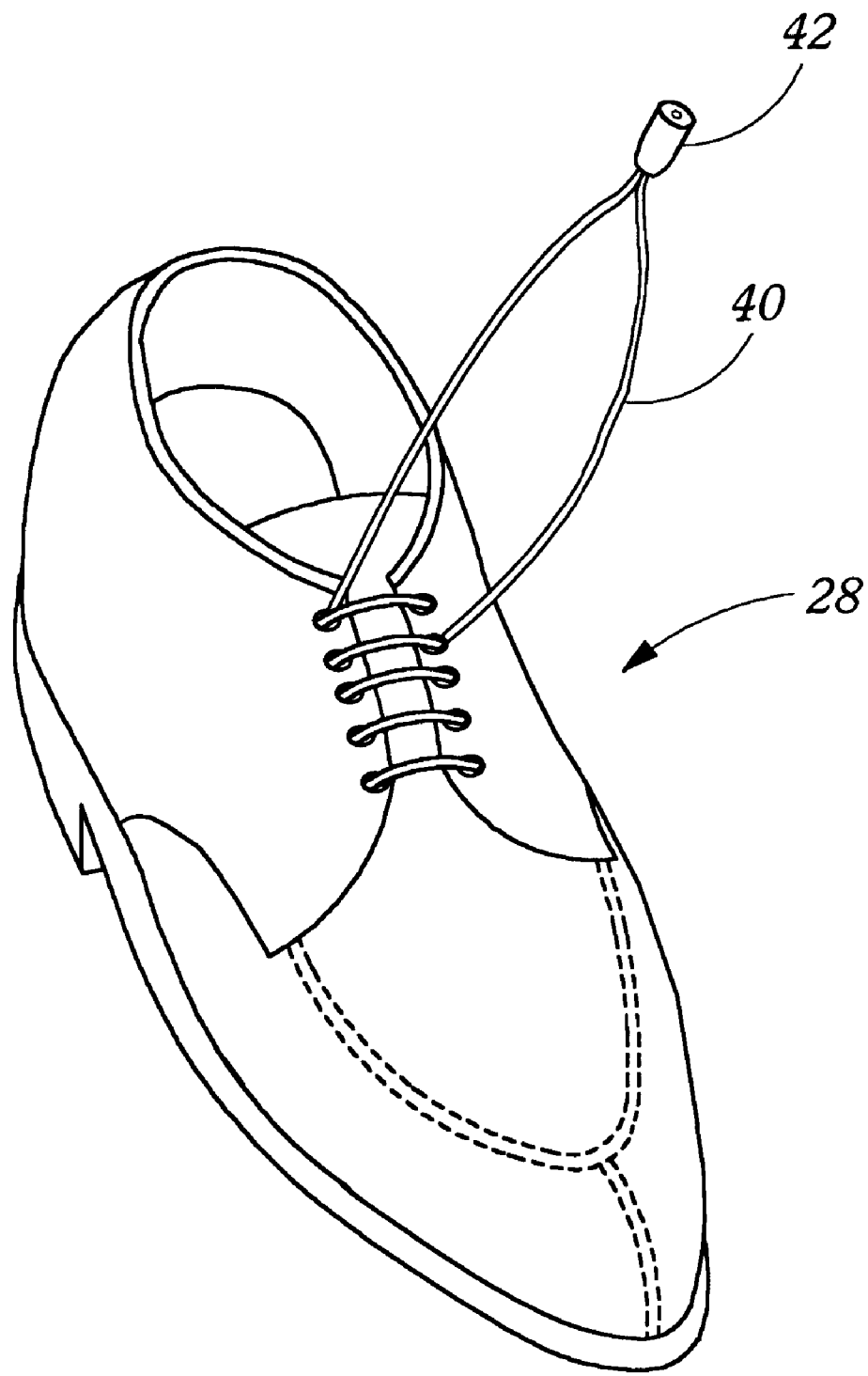
FIG. 10 illustrates yet another modified form of a signaling device of the invention.

FIG. 10 illustrates an alternate arrangement of attachment of the signaling device 40 of FIG. 8 with a loop of electrically conductive material and connector 42 onto an item of inventory 28.

Figures 11, 12:
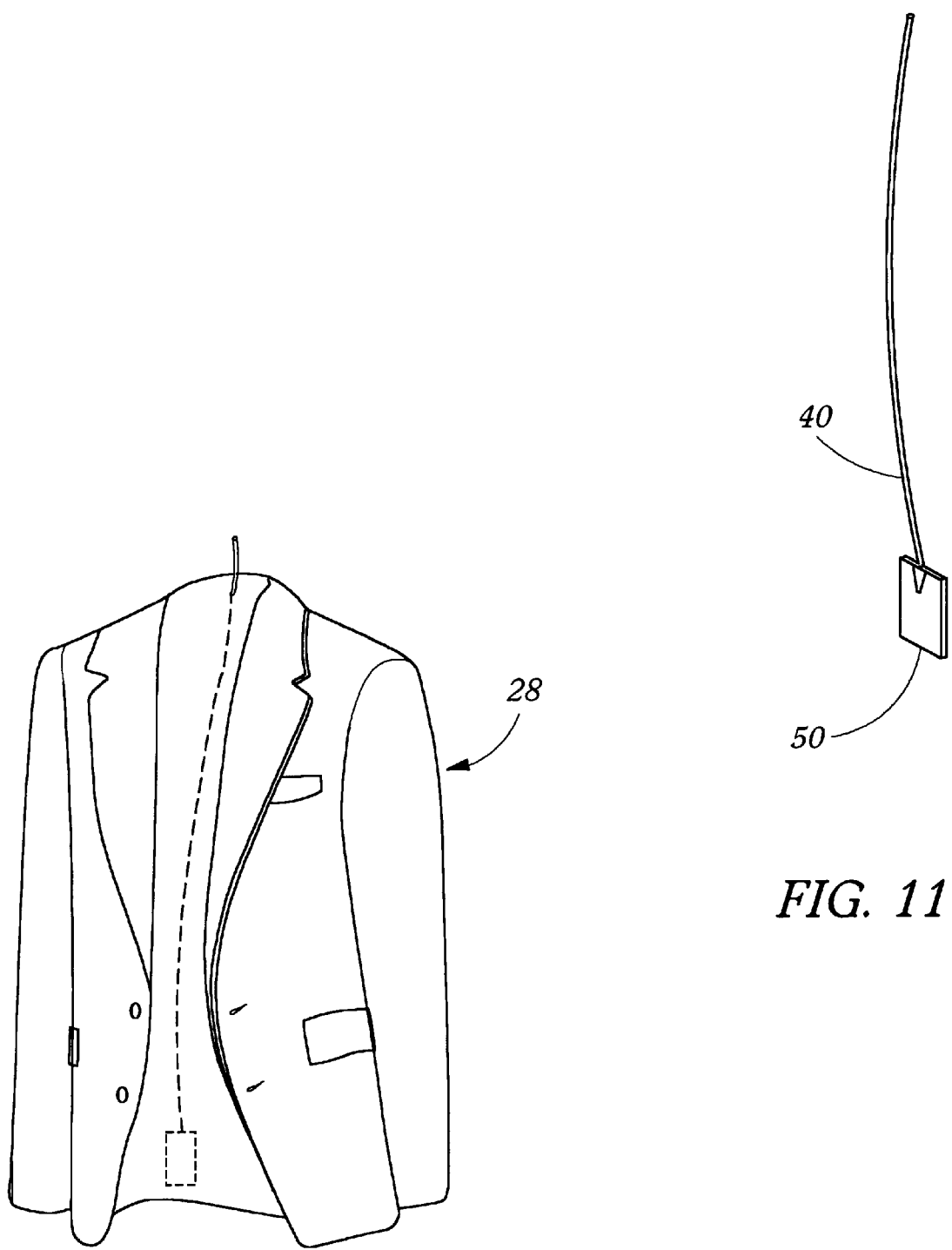
FIG. 11 illustrates a coat with the signaling device of FIG. 11 sewn therein.
FIG. 12 illustrates a shoe with a signaling device attached.

FIG. 11 illustrates another alternate embodiment of a signaling device 40, suitable for incorporation into an item of inventory 28 during the process of manufacturing, which comprises a microchip 50 which is electrically connected to a set of electrical contacts disposed upon or within connector 42 by electric ally conductive material. The microchip 50 is programmed with information identifying the particular item of inventory 28 to which it is attached. When connector 42 is secured through an aperture 44 of rack 26, the set of electrical contacts of connector 42 are in electrical contact with the corresponding set of electrical contacts disposed within aperture 44 of rack 26; therefore, the microchip 50 is able to communicate its programmed information, identifying the particular item of inventory 28 to which it is attached, to the system controller 10 through the control center 24 and rack 26. Since the presence or absence of connections at particular locations is monitored by the system controller 10, the system controller 10 is further able to identify when a item of inventory 28 with a signaling device 40 incorporating a microchip 50 is added or removed from a particular location on a rack 26 and identify that particular item of inventory 28.

FIG. 12 illustrates the signaling device 40 of FIG. 11 that has been incorporated into an item of inventory 28 during the manufacturing process, and indicating one possible arrangement, within the item of inventory 28, of the signaling device 40 with microchip 50.

Although the detailed description of the preferred embodiments is directed toward illustrating the above described embodiments, the present invention is not limited to such embodiments, as variations and modifications may be made without departing from the scope of the present invention as claimed herein.

What is claimed is:

1. A self service sales and security system comprising: a rack having a number of locations to support specific items of inventory; a system controller; signaling means for communicating the presence and location of each item of inventory, the signaling means comprising a length of electrically conductive material that is attached to the item of inventory at each location of the rack with each end of the length of electrically conductive material terminating on a separate contact of a connector, said connector being adapted to detachably attach to the rack; a pair of electrical contacts at each location of the rack communicate with the system controller, and are arranged so that contact is established between each contact of the connector and a corresponding contact of the rack when the connector is attached to the rack, thereby establishing a closed circuit when the connector is attached to the rack, which is used to indicate the presence of the item of inventory at the location on the rack; an individual identity input means for providing customer identification; and data memory means; the system controller monitors the signaling means for each item of inventory, monitors the individual identity input means, and communicates with the data memory means, for comparing changes in the presence and location of each item of inventory and records changes in the presence and location of each item of inventory with a corresponding customer identification.

2. A self service sales and security system as defined in claim 1 in which the individual identity input means for providing customer identification comprises a card with unique data recorded thereon for identifying a customer, and a card reader able to communicate with the system controller, capable of receiving the card and perceiving the data recorded on the card.

3. A self service sales and security system as defined in claim 1 in which the individual identity input means for providing customer identification comprises a tactile input device with two or more selectable input values able to communicate with the system controller, whereby selection of a unique series of input values would provide customer identification.

4. A self service sales and security system as defined in claim 1 further comprising locking means for selectively releasing an item of inventory at a location, from the rack, in response to a signal from the system controller.

5. A self service sales and security system according to claim 1 further comprising an alarm capable of detecting an alarm signal of the system controller for indicating an unauthorized change in the presence and location of an item of inventory.

6. A self service sales and security system comprising: a rack having a number of locations to support specific items of inventory; a system controller; signaling means for communicating the presence and location of each item of inventory, the signaling means comprising a semi conductor circuit that is attached to the item of inventory at each location of the rack, having two or more electrical contacts extending therefrom which are electrically connected to a set of contacts of a connector, said connector being adapted to detachably attach to the rack; a set of two or more electrical contacts at each location of the rack communicate with the system controller, and are arranged so that contact is established between each contact of the connector and a corresponding contact of the rack when the connector is attached to the rack, thereby establishing electrical communication between the semi conductor circuit and the system controller when the connector is attached to the rack indicating the presence of the item of inventory; an individual identity input means for providing customer identification; and data memory means; the system controller monitors the signaling means for each item of inventory, monitors the individual identity input means, and communicates with the data memory means, for comparing changes in the presence and location of each item of inventory and records changes in the presence and location of each item of inventory with a corresponding customer identification.

7. A self service sales and security system as defined in claim 6 in which the semi conductor circuit is programmed with data to identify the item of inventory to which it is attached.

8. A self service sales and security system as defined in claim 6 in which the semi conductor circuit comprises a microchip.

9. A self service sales and security system as defined in claim 8 in which the microchip is programmed with data to identify the item of inventory to which it is attached.

10. A self service sales and security system as defined in claim 8 in which the individual identity input means for providing customer identification comprises a card with unique data recorded thereon for identifying a customer, and a card reader able to communicate with the system controller, capable of receiving the card and perceiving the data recorded on the card.

11. A self service sales and security system as defined in claim 8 further comprising locking means for selectively releasing an item of inventory at a location, from the rack, in response to a signal from the system controller.

12. A self service sales and security system according to claim 8 further comprising an alarm capable of detecting an alarm signal of the system controller for indicating an unauthorized change in the presence and location of an item of inventory.

13. A self service sales and security system as defined in claim 8 in which the individual identity input means for providing customer identification comprises a tactile input device with two or more selectable input values able to communicate with the system controller, whereby selection of a unique series of input values would provide customer identification.

14. A self service sales and security system as defined in claim 6 in which the individual identity input means for providing customer identification comprises a card with unique data recorded thereon for identifying a customer, and a card reader able to communicate with the system controller, capable of receiving the card and perceiving the data recorded on the card.

15. A self service sales and security system as defined in claim 6 further comprising locking means for selectively releasing an item of inventory at a location, from the rack, in response to a signal from the system controller.

16. A self service sales and security system according to claim 6 further comprising an alarm capable of detecting an alarm signal of the system controller for indicating an unauthorized change in the presence and location of an item of inventory.

17. A self service sales and security system as defined in claim 6 in which the individual identity input means for providing customer identification comprises a tactile input device with two or more selectable input values able to communicate with the system controller, whereby selection of a unique series of input values would provide customer identification.

* * * * *